United States Patent
Kou et al.

(10) Patent No.: US 11,323,899 B2
(45) Date of Patent: May 3, 2022

(54) METHOD AND DEVICE FOR REPORTING SIGNAL QUALITY, STORAGE MEDIUM, AND PROCESSOR

(71) Applicant: XI'AN ZHONGXING NEW SOFTWARE CO., LTD., Shaanxi (CN)

(72) Inventors: Shuaihua Kou, Shenzhen (CN); Peng Hao, Shenzhen (CN); Feng Bi, Shenzhen (CN); Xing Liu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 57 days.

(21) Appl. No.: 16/652,125

(22) PCT Filed: Sep. 20, 2018

(86) PCT No.: PCT/CN2018/106783
§ 371 (c)(1),
(2) Date: Mar. 30, 2020

(87) PCT Pub. No.: WO2019/062646
PCT Pub. Date: Apr. 4, 2019

(65) Prior Publication Data
US 2020/0236566 A1    Jul. 23, 2020

(30) Foreign Application Priority Data
Sep. 30, 2017 (CN) .......................... 201710919730.5

(51) Int. Cl.
*H04W 76/18* (2018.01)
*H04W 24/10* (2009.01)
(Continued)

(52) U.S. Cl.
CPC .......... *H04W 24/08* (2013.01); *H04B 17/309* (2015.01); *H04W 24/10* (2013.01); *H04W 76/18* (2018.02)

(58) Field of Classification Search
CPC ..... H04W 24/08; H04W 24/10; H04W 76/18; H04B 17/309
See application file for complete search history.

(56) References Cited

U.S. PATENT DOCUMENTS

| | | | |
|---|---|---|---|
| 2012/0115469 A1 | 5/2012 | Chen et al. | |
| 2014/0126403 A1 | 5/2014 | Siomina | |

(Continued)

FOREIGN PATENT DOCUMENTS

| | | | |
|---|---|---|---|
| CN | 101547465 A | 9/2009 | |
| CN | 103428752 A | 12/2013 | |

(Continued)

OTHER PUBLICATIONS

3GPP TSG RAN WGI NR Ad Hoc Meeting, Qingdao, China Jun. 27-30, 2017 Discussion on remaining issues of radio link monitoring R1-1709921, pp. 1-4.

(Continued)

*Primary Examiner* — Brian P Cox
(74) *Attorney, Agent, or Firm* — Bond Schoeneck & King, PLLC; George McGuire

(57) ABSTRACT

Provided are a method and device for reporting signal quality. The method includes: measuring signal quality of a measurement signal within a radio link monitoring (RLM) assessment period and before a moment when the measurement signal changes and/or measuring signal quality of a changed measurement signal within the RLM assessment period; comparing, by a UE, the measured signal quality with a preset threshold value; and generating, by the UE, an in-sync indication or an out-of-sync indication according to the comparison result and reporting the in-sync indication or the out-of-sync indication.

17 Claims, 5 Drawing Sheets

(51) Int. Cl.
*H04W 24/08* (2009.01)
*H04B 17/309* (2015.01)

(56) References Cited

U.S. PATENT DOCUMENTS

| | | |
|---|---|---|
| 2014/0269368 A1 | 9/2014 | Xu et al. |
| 2019/0181969 A1* | 6/2019 | Zhang .................... H04B 17/30 |

FOREIGN PATENT DOCUMENTS

| | | |
|---|---|---|
| CN | 106797571 A | 5/2017 |
| JP | 2018518091 A | 7/2018 |
| JP | 2019504578 A | 2/2019 |

OTHER PUBLICATIONS

3GPP TSG RAN WG1 Meeting #90 Prague, Czech Republic, pp. 1-5 Aug. 21-25, 2017 WF on configuration of RS used for radio link monitoring R1-1714670.
Translated JP OA1, pp. 1-5.
Translated CN First Search Report, 1 page.
European Search Report, May 12, 2021, pp. 1-8.
3GPP TSG RAN WG1 NR Ad-Hoc#2 R1-1709900 Qingdao, China Jun. 27-30, 2017 Radio Link Monitoring in NR, pp. 1-6.
ZTE. "Radio Link Monitoring in NR" 3GPP TSG RAN WGI NR Ad-Hock#2, RI-1709900, Jun. 17, 2017 (Jun. 17, 2017), section 2.1.
International Search Report Form PCT/ISA/210, and Written Opinion Form PCT/ISA/237, International Application No. PCT/CN2018/106783, pp. 1-5 International Filing dated Sep. 20, 2018 mailing date of search report Dec. 6, 2018.

\* cited by examiner

METHOD AND DEVICE FOR REPORTING SIGNAL QUALITY, STORAGE MEDIUM, AND PROCESSOR

CROSS-REFERENCES TO RELATED APPLICATIONS

This is a National Stage Application, filed under 35 U.S.C. 371, of International Patent Application No. PCT/CN2018/106783, filed on Sep. 20, 2018, which claims priority to a Chinese patent application No. 201710919730.5 filed on Sep. 30, 2017, disclosure of which is incorporated herein by reference in its entirety.

TECHNICAL FIELD

The present disclosure relates to communications and, in particular, to a method and device for reporting signal quality, a storage medium and a processor.

BACKGROUND

With the continuous progress of radio technology, a great deal of radio services emerges, but spectrum resources relied on by the radio services are limited. Therefore, in the face of the increasing demand of bandwidth, the spectrum resources between 300 megahertz (MHz) and 3 gigahertz (GHz) mainly used by the conventional commercial communication are extremely tense, and thus cannot meet the demand of the future wireless communications.

In future wireless communications, the carrier frequency higher than the carrier frequency adopted to support the fourth generation (4G) communication system will be extended, such as 28 GHz, 45 GHz and so on, and the potential operating frequency band will reach 100 GHz. At the high frequency band (>6 GHz), since the attenuation of the electromagnetic wave is very large, the beamforming method is usually required to resist the attenuation of the signal and enhance the transmission distance of the signal. Therefore, the signal is usually transmitted or received in the form of beam. Generally, a base station configures one or more beams having better quality for a user equipment (UE) for communication. Since signal quality of the beam changes continuously, the configured beam also changes constantly, such that the signal quality of the beam used by the UE can meet the communication requirements all the time.

In order to ensure normal communication, the UE, specifically the physical layer, needs to periodically measure quality of a current link, and an instruction is periodically transmitted to a higher layer of the UE according to the measurement result, such that the higher layer knows the current state of the UE. For example, when the quality of the signal is greater than a certain threshold value, the UE reports in-sync (IS) to the higher layer; while when the quality of the signal is less than the certain threshold value, the UE reports out-of-sync (OOS) to the higher layer. Generally, the UE averages multiple measurement results over one time period (e.g., a radio link monitoring (RLM) assessment period) as the signal quality over this time period. In the future wireless communication system, if the UE is configured with multiple beams, the UE needs to measure signal quality of the multiple beams at the same time, obtain signal quality over a specific time period, and report a corresponding indication to the higher layer. In the related art, the signal quality after serving beams configured for the UE over a certain time period change cannot be obtained, and thus, a correct indication cannot be reported to the higher layer. There is no effective solution to this problem in the related art.

SUMMARY

Embodiments of the present disclosure provide a method and device for reporting signal quality, a computer storage medium and a processor, so as to at least resolve the problem in the related art that a correct indication cannot be reported to a higher layer when signal quality after serving beams configured for a UE over a certain time period change cannot be obtained.

According to an aspect of the embodiments of the present disclosure, a method for reporting signal quality is provided. The method includes: measuring signal quality of a measurement signal within an RLM assessment period and before a moment when the measurement signal changes and/or measuring signal quality of a changed measurement signal within the RLM assessment period; comparing the measured signal quality with a preset threshold value; and generating an IS indication or an OOS indication according to the comparison result and reporting the IS indication or the OOS indication.

According to another aspect of the embodiments of the present disclosure, a device for reporting signal quality is provided. The device includes: a measurement module, which is configured to measure signal quality of a measurement signal within an RLM assessment period and before a moment when a measurement signal of a UE changes and/or measure signal quality of a changed measurement signal within the RLM assessment period; a comparison module, which is configured to compare the measured signal quality with a preset threshold value; and a generation and report module, which is configured to generate an IS indication or an OOS indication according to the comparison result and report the IS indication or the OOS indication.

According to another aspect of the embodiments of the present disclosure, a storage medium is provided. The storage medium includes stored programs which, when executed, perform the method for reporting signal quality described above.

According to another aspect of the embodiments of the present disclosure, a processor is provided. The processor is configured to execute programs which, when executed, perform the method for reporting signal quality described above.

Through the embodiments of the present disclosure, signal quality of a measurement signal within an RLM assessment period and before a moment when the measurement signal changes and/or signal quality of a changed measurement signal within the RLM assessment period are measured, that is, signal quality of a changing measurement signal can be measured; then the measured signal quality is compared with a preset threshold value, and an IS indication or an OOS indication is generated according to the comparison result and the IS indication or the OOS indication is reported, thereby resolving the problem in the related art that the correct indication cannot be reported to the higher layer when the signal quality after serving beams configured for the UE over a certain time period change cannot be obtained, and filling the gap in the related art.

BRIEF DESCRIPTION OF DRAWINGS

The drawings described herein, which are included to provide a further understanding of the present disclosure and constitute a part of the present disclosure, illustrate embodiments of the present disclosure and together with the description serve to explain the present disclosure, and thus are not intended to limit the present disclosure. In the drawings.

DETAILED DESCRIPTION

The present disclosure will be described hereinafter in detail with reference to the drawings and in conjunction with embodiments. It is to be noted that if not in collision, the embodiments and features therein in the present application can be combined with each other.

It is to be noted that the terms "first", "second" and the like in the description, claims and drawings of the present disclosure are used to distinguish between similar objects and are not necessarily used to describe a particular order or sequence.

Embodiment One

Figure 1:
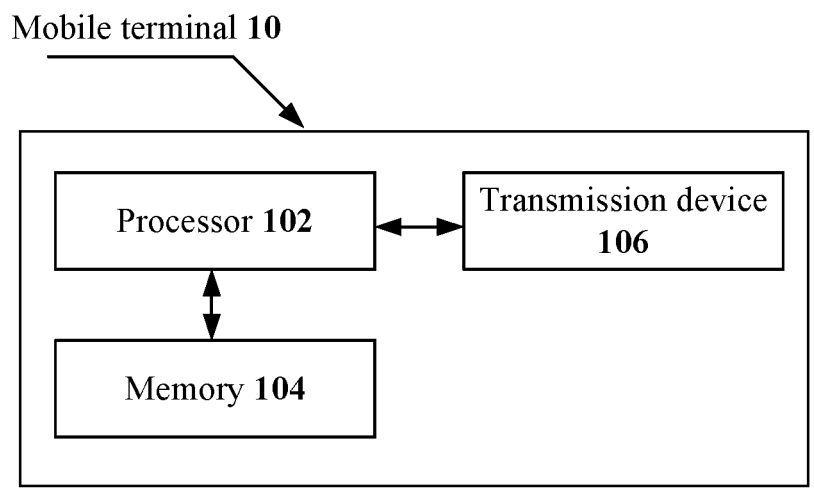
FIG. 1 is a schematic diagram of a hardware structure of a mobile terminal of a method for reporting signal quality according to an embodiment of the present disclosure.

The method embodiment provided in this embodiment of the present application may be executed in a mobile terminal. FIG. 1 is a schematic diagram of a hardware structure of a mobile terminal of a method for reporting signal quality according to an embodiment of the present disclosure. As shown in FIG. 1, the mobile terminal 10 may include one or more (only one shown in the figure) processors 102 (the processors 102 may include, but are not limited to, a processing device such as a microprocessor (e.g., a micro-programmed control unit (MCU) or a programmable logic device (e.g., a field programmable gate array (FPGA)), a memory 104 for storing data and a transmission device 106 for communication functions. It should be understood by those skilled in the art that the structure shown in FIG. 1 is only illustrative and is not intended to limit the structure of the above electronic device. For example, the mobile terminal 10 may further include more or fewer components than those shown in FIG. 1, or have a configuration differing from the configuration shown in FIG. 1.

The memory 104 may be used for storing software programs and modules of application software, such as program instructions/modules corresponding to the method for reporting signal quality in the embodiments of the present disclosure, and the processor 102 executes various functional applications and data processing by executing the software programs and modules stored in the memory 104, e.g., to implement the above method. The memory 104 may include a high-speed random access memory, and may also include a non-volatile memory, such as one or more magnetic disk storage devices, a flash memory, or other non-volatile solid-state memory. In some embodiments, the memory 104 may further include a memory that is located remotely from the processor 102, and these remote memories may be connected to the mobile terminal 10 via a network. Examples of the network include, but are not limited to, the Internet, Intranet, local area network, mobile communication network and a combination thereof.

The transmission device 106 is used for receiving or sending data via a network. Specific examples of the network described above may include a wireless network provided by a communication provider of the mobile terminal 10. In one example, the transmission device 106 includes a network interface controller (NIC), which can be connected to other network devices through a base station so as to communicate with the Internet. In one example, the transmission device 106 may be a radio frequency (RF) module, which is used for communicating with the internet in a wireless way.

In the future wireless technologies, the beamforming technology is introduced to transmit or receive signals in the form of beams. For example, in downlink, a base station transmits signals in the form of beams, a UE receives signals in the form of beams, and a transmission beam of the base station and a reception beam of the UE form a beam pair. The beam pair currently used by the UE for communication is called a serving beam, and the base station may configure multiple serving beams for the UE at the same time to improve scheduling flexibility of the base station. The UE needs to detect the quality of multiple serving beams to guarantee normal communication.

In the related art, the base station transmits a beam or multiple beams on a resource, and the UE can obtain signal quality of the corresponding beam or multiple beams by measuring signals on the resource. Generally, the UE periodically performs measurements on periodic resources. In a communication system, measurement of a medium RLM is mainly based on a synchronization signal (SS) or a channel state information reference signal (CSI-RS), that is, the UE measures the SS and the CSI-RS to obtain corresponding signal quality, and in this embodiment, a reference signal (RS) is used instead of the SS and the CSI-RS for describing the measurement signal. In this embodiment, it is assumed that one RS corresponds to one beam, that is, the base station transmits only one beam on one RS resource, and transmits different beams on different RS resources.

A network side, which may be specifically the base station, configures N serving beams for the UE, and N is a positive integer greater than or equal to 1. Therefore, the UE, specifically the physical layer of the UE, needs to detect signal quality of the corresponding N RSs. The UE averages the multiple measured measurement results within each RLM assessment period, compares the average result with a corresponding threshold value, and reports the IS/OOS indication to the higher layer of the UE according to the comparison results. This process is also called RLM. In some cases, some measurement results in the assessment period cannot be used for average calculation. The measurement results that cannot be used for average calculation are called invalid measurement results, while measurement results that can be used for average calculation are called valid measurement results. In this embodiment, the valid measurement results are used as objects.

Figure 2:
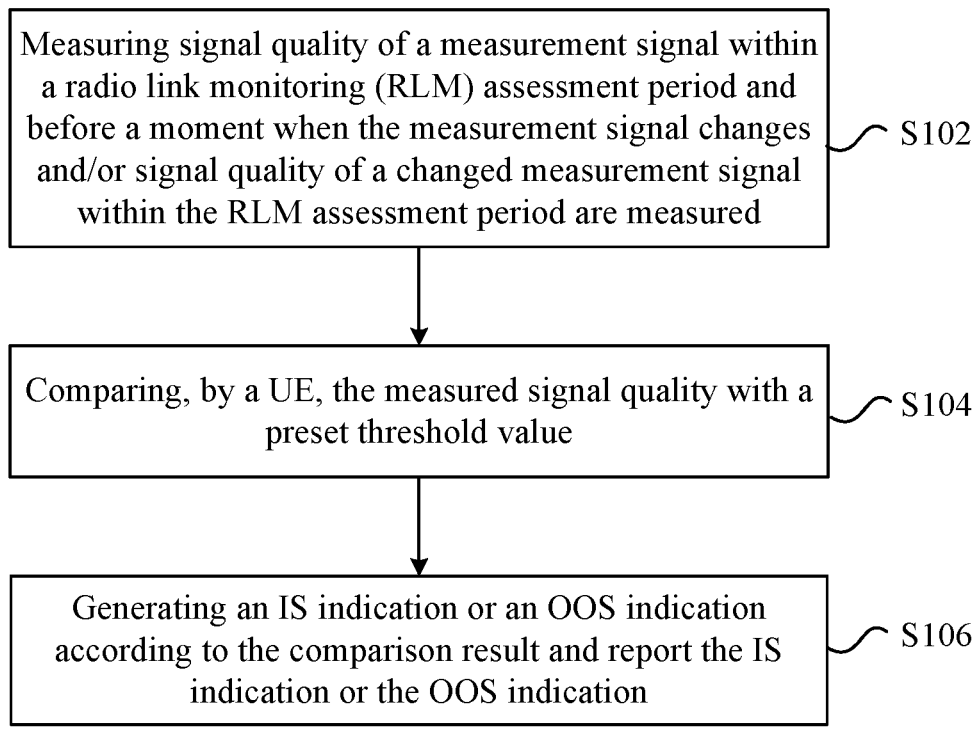
FIG. 2 is a flowchart of a method for reporting signal quality according to an embodiment of the present disclosure.

This embodiment provides a method for reporting signal quality executed on the above mobile terminal. FIG. 2 is a flowchart of a method for reporting signal quality according to this embodiment of the present disclosure. As shown in FIG. 2, the method includes steps S102, S104 and S106 described below.

In step S102, signal quality of a measurement signal within an RLM assessment period and before a moment when the measurement signal changes and/or signal quality of a changed measurement signal within the RLM assessment period are measured.

In step S104, the measured signal quality is compared with a preset threshold value.

In step S106, an IS indication or an OOS indication is generated according to the comparison result and the IS indication or the OOS indication is reported.

Through the above steps S102 to S106, the UE measures signal quality of a measurement signal within an RLM assessment period and before a moment when the measurement signal changes and/or signal quality of a changed measurement signal within the RLM assessment period, that is, the UE can measure signal quality of a changing measurement signal, then compares the measured signal quality with a preset threshold value, and generates an IS indication or an OOS indication according to the comparison result and reports the IS indication or the OOS indication, thereby resolving the problem in the related art that the correct indication cannot be reported to the higher layer when the signal quality after serving beams configured for the UE over a certain time period change cannot be obtained, and filling the gap in the related art.

It is to be noted that the communications entity for executing the steps S102 to S106 is the UE which specifically may be the physical layer of the UE. In an optional embodiment, the reporting in the above method for reporting signal quality may specifically be that: the physical layer of the UE reports the IS indication or the OOS indication to the higher layer of the UE.

It is to be noted that the higher layer mentioned in this embodiment is a logical entity located on a terminal side; and an entity on a network side includes a base station, an evolved base station, a relay, a roadside stations, etc., which are all replaced by the network side in the following description.

In addition, there are two causes for the RS change for RLM measurement in this embodiment: one is that the measurement RS set needs to be updated due to handover of the serving beam of the UE; and the other is that the beam failure needs to be recovered, and the RS measured by RLM is usually updated after the beam is recovered. The manner of this embodiment will be described in detail in combination with two cases.

Cause one: in a process of updating a set of measurement signals of the UE, the measurement signal within the RLM assessment period and before the moment when the measurement signal changes refers to a measurement signal set before a moment of updating the measurement signal set and within the RLM assessment period; and the changed measurement signal within the RLM assessment period refers to a measurement signal set after the measurement signal set is updated and within the RLM assessment period.

In the process of updating the measurement signal set, in the related art, generally, in addition to periodically checking the signal quality of the serving beam (corresponding to the measurement signal), the UE also needs to detect measurement signals corresponding to other non-serving beams and periodically or non-periodically report measurement results to the network side, and after receiving the measurement report transmitted by the UE, the network side transmits a corresponding indication to the UE, where the indication is used for notifying the UE of the updated serving beam or measurement signal. This process is called beam management.

The UE, after receiving the indication from the network side, applies an RS corresponding to the updated serving beam to the RLM. Through the beam management, when the signal quality of the serving beam is weakened or other beams can meet the communication requirement, the network side can timely remove serving beams which cannot meet the communication quality from the serving beam set or add other beams which can meet the communication requirement into the serving beam set.

Due to the existence of beam management, when N serving beam sets configured within a certain RLM assessment period change, the RSs detected by the UE also change, so as to ensure that the detected RS corresponds to the serving beam of the UE, where the beam before the moment when the serving beam set changes is called the old beam set, and the corresponding RS is called the old RS (corresponding to the serving beam set before the moment of updating the serving beam set and within the RLM assessment period in the above cause one); the beam set after the moment when the serving beam set changes is called the new beam set, and its corresponding RS is called the new RS (corresponding to the serving beam set after the serving beam set is updated and within the RLM assessment period in the above cause one). It is to be noted that the new beam set and the old beam set may have the same beams.

Cause two: in a process of recovering from a beam failure, the measurement signal within the RLM assessment period and before the moment when the measurement signal changes refers to a measurement signal in which a beam failure occurs before a moment when the beam failure is successfully recovered and within the RLM assessment period; and the changed measurement signal within the RLM assessment period refers to a measurement signal in which the beam is successfully recovered within the RLM assessment period.

The process of beam recovery refers to that: when signal quality of all serving beams is weakened and cannot guarantee the normal communication of the UE (usually less that a set threshold value), that is, the serving beam failure occurs, in this case, the UE identifies new beams on the configured resource. In condition that the UE identifies that there are new beams which can meet communication requirements, the UE transmits a beam failure recovery request to the network side to request beam recovery, so as to perform the normal communication, where the beam failure recovery request usually carries information on new beams. The UE side, after receiving beam failure recovery request information, transmits a corresponding feedback to the UE, where the feedback acknowledges the new serving beams to the UE. The UE receives the beam failure recovery request feedback transmitted by the network side for representing that the serving beam failure is successfully recovered.

Within a certain RLM assessment period, after the serving beam is successfully recovered, which means that there are new beams which meet the communication requirements, in this case, the UE needs to measure the RS corresponding to the recovered beam, where the RS detected by the UE before the moment when the beam is successfully recovered is called the old RS (corresponding to the serving beam in which the failure occurs before the moment of identifying the new serving beam and within the RLM assessment period and the serving beam in which the failure occurs before the moment when the serving beam failure is successfully recovered and within the RLM assessment period in the above cause two), and the RS additionally detected by the UE after the beam is successfully recovered is called the new RS (corresponding to the new serving beam identified within the RLM assessment period in the above cause two). It is to be noted that the new beam set and the old beam set may have the same beams.

It is to be noted that the signal quality metric used for beam failure recovery is the same as the signal quality metric used for the RLM. For example, both the signal quality metrics use reference signal received power (RSRP) or signal to noise ratio (SINR). The signal quality metric used for beam failure recovery may be different from the signal quality metric used for the RLM.

In addition, in the cause two, in the process of recovering from the beam failure and in condition that the successfully recovered beam is the same as the failed beam, the measurement signal in which the beam is successfully recovered within the RLM assessment period refers to:

in condition that the moment when the failure occurs is outside the RLM assessment period, a measurement signal within the RLM assessment period and after the moment when the beam is successfully recovered; and in condition that the moment when the failure occurs is within the RLM assessment period, a measurement signal before the moment when the failure occurs within the RLM assessment period, within the RLM assessment period and after the moment when the beam is successfully recovered.

In other words, if the beam after the successful recovery is the same as the beam before the recovery, the valid measurement result of the successfully recovered beam within the RLM assessment period is: a measurement result of the successfully recovered beam before the moment when the failure occurs and a measurement result of the successfully recovered beam after the beam is successfully recovered.

Figure 3:
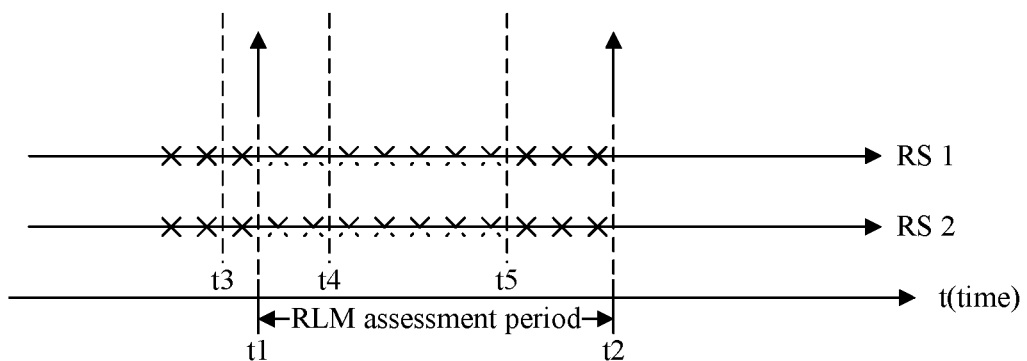
FIG. 3 is a schematic diagram one illustrating measurement on a serving beam within an RLM assessment period according to an embodiment of the present disclosure.

The above cases will be illustrated through FIG. 3.

FIG. 3 is a schematic diagram one illustrating measurement on a serving beam within an RLM assessment period according to an embodiment of the present disclosure. As shown in FIG. 3, RS1 and RS 2 are used for the RLM and correspond to beam 1 and beam 2, respectively. If the beam failure occurs at time t3 and the beam 1 is successfully recovered at time t5, the valid measurement result of the RS 1 within the RLM period includes the measurement result on the RS 1 within time of t5 to t2. If the beam failure occurs at time t4 and the beam 1 is successfully recovered at time t5, the valid measurement result within the RLM period needs to include the measurement result on the RS 1 within time of t1 to t4 and t5 to t2.

In one optional embodiment of this embodiment, the manner of measuring by the UE the signal quality of the measurement signal within the RLM assessment period involved in step S102 in this embodiment includes a manner one and a manner two.

Manner one: the UE acquires signal quality of one or more measurement signals of the UE at multiple designated moments within the RLM assessment period, and averages the signal quality of each measurement signal at the multiple designated moments, where the averaged result is used as the measured signal quality corresponding to the one or more measurement signals respectively.

Manner two: the UE acquires signal quality of one or more measurement signals of the UE at multiple designated moments within the RLM assessment period, determines maximum signal quality at each specific moment from the acquired signal quality, and averages all of the determined maximum signal quality, where the averaged result is used as the measured signal quality.

For the above manner one and manner two, in specific application scenarios of this embodiment, the manner one may be: averaging valid measurement results on each measurement RS within one RLM assessment period, and configuring the averaged result as the signal quality of each measurement RS within the period. The manner two may be: finding maximum values of valid measurement results on all measurement RSs at each measurement moment within one RLM assessment period, averaging the maximum value at each moment, and configuring the averaged result as an optimal value of the signal quality within this assessment period. If no valid measurement result exists on all measurement RSs at a certain measurement moment, no valid measurement result exists at this measurement moment.

Figure 4:
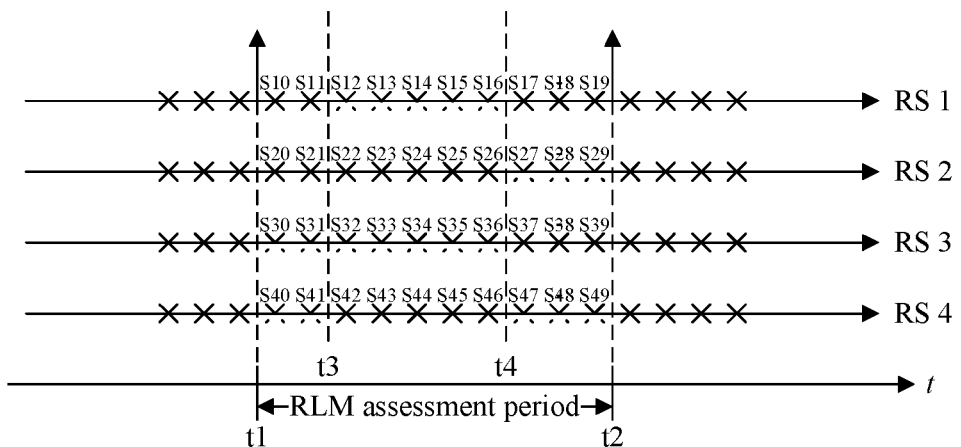
FIG. 4 is a schematic diagram two illustrating measurement on a serving beam within an RLM assessment period according to an embodiment of the present disclosure.

The above case will be illustrated through FIG. 4. FIG. 4 is a schematic diagram two illustrating measurement on a serving beam within an RLM assessment period according to an embodiment of the present disclosure. As shown in FIG. 4, RS 1 to RS 4 correspond to beam 1 to beam 4 respectively; within time of t1 to t2 within the RLM assessment period, measurement results of the RS 1 are S10 to S19 in sequence among which measurement results within time of t3 to t4 are valid measurement results, measurement results of the RS 2 are S20 to S29 in sequence among which measurement results within time of t4 to t2 are valid measurement results, measurement results of the RS 3 are S30 to S39 in sequence among which measurement results within time of t1 to t4 are valid measurement results, and measurement results of the RS 4 are S40 to S49 in sequence among which measurement results within time of t1 to t3 and t4 to t2 are valid measurement results.

The signal quality of each beam obtained in the manner one is:

$S_{beam1}=(S12+S13+S14+S15+S16)/5;$ signal quality of beam 1

$S_{beam2}=(S27+S28+S29)/3;$ signal quality of beam 2

$S_{beam3}=(S30+S31+S32+S33+S34+S35+S36)/7;$ signal quality of beam 3

$S_{beam4}=(S40+S41+S47+S48+S49)/5.$ signal quality of beam 4

If the signal quality of beams 1 to 4 is less than a threshold value Q_out, the physical layer generates the OOS, and reports the OOS to the higher layer. If the signal quality of one beam is greater than a threshold value Q_in, the physical layer generates an IS, and reports the IS to the higher layer.

It can be understood that the threshold value Q_out is less than the threshold value Q_in. Specific values and value ranges of threshold values Q_out and Q_in are related to the processing capability of the UE and specifically related to the processing capability of hardware and/or software. The threshold value Q_out is a first threshold value, and the threshold value Q_in is a second threshold value.

The optimal value of the signal quality within this assessment period obtained in the manner two is:

$$S_{max}=[\max(S30,S40)+\max(S31,S41)+\max(S12,S32)+\ldots+\max(S29,S49)]/10.$$

If Smax is less that the threshold value Q_out, the physical layer reports the OOS to the higher layer, and if Smax is greater than the threshold value Q_in, the physical layer reports the OOS to the higher layer.

Based on the above manner one and manner two, in a case of the cause one, the manner of measuring the signal quality is: in the process of updating a measurement signal set of the UE, taking a measurement signal set before the moment of updating the measurement signal set and within the RLM assessment period and a measurement signal set after the measurement signal set is updated and within the RLM assessment period as the object of signal quality measurement in the manner one and the manner two; or in the process of updating the measurement signal set of the UE, taking the measurement signal set after the measurement signal set is updated and within the RLM assessment period as the object of signal quality measurement in the manner one and the manner two.

Based on the detailed description of the cause one in the specific application scenario, in the case of the cause one, the manner of measuring the signal quality in the specific application scenario may be as follows.

(1) The measurement result of the old RS before the moment when the beam set changes is taken as the valid measurement result, all measurement results of the new RS within this period are taken as the valid measurement result, and the signal quality is obtained by adopting calculation manners of the manner one and the manner two in the embodiment.

(2) All measurement results of the new RS within this period are taken as the valid measurement result, and the signal quality is obtained by adopting calculation manners of the manner one and the manner two in the embodiment.

Figure 5:
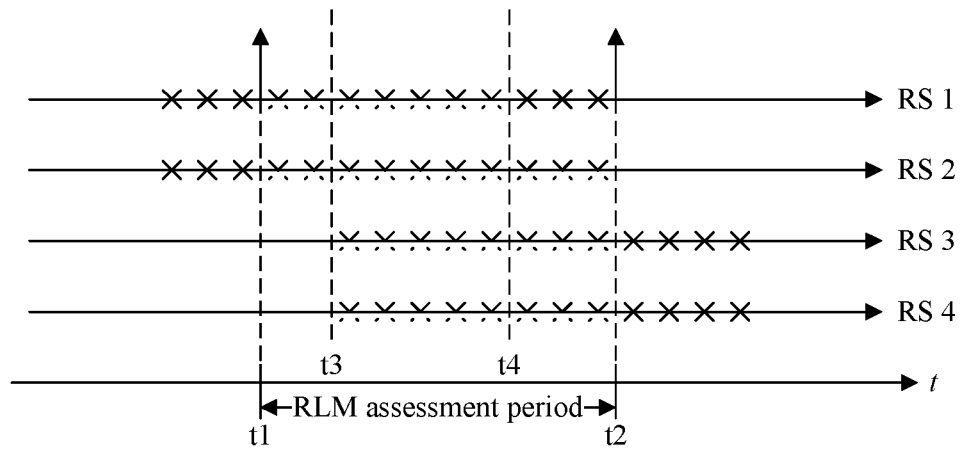
FIG. 5 is a schematic diagram three illustrating measurement on a serving beam within an RLM assessment period according to an embodiment of the present disclosure.

The specific manner of measuring signal quality will be illustrated based on the cause one described above and FIG. 5. FIG. 5 is a schematic diagram three illustrating measurement on a serving beam within an RLM assessment period according to an embodiment of the present disclosure. As shown in FIG. 5, beams 1 to 4 are transmitted on RS 1 to RS 4 respectively, and if the base station configures beam 1 and beam 2 to the UE as serving beams for signal reception, the UE needs to detect RS 1 and RS 2. The time period of t1 to t2 is one RLM assessment period. Since the signal quality of RS 1 is weakened, the network side configures more RSs to the UE for measurement at t3, and the UE reports the measurement result to the network side. The network side configures beams 2 to 4 to the UE as serving beams at time t4 according to the measurement result. Since beam 1 is no longer taken as the serving beam of the UE, the UE needs to detect the signal quality of RS 2, RS 3 and RS 4 after the time t4. The valid measurement result within this assessment period may be as follows.

1) Measurement results of RS 1 within time of t1 to t4, measurement results of RS 2 within time of t1 to t2 and measurement results of RS 3 and RS 4 within time of t3 to t2 are taken as the valid measurement result, and the signal quality within this period is obtained through calculation manners of the manner one and manner two in the embodiment.

2) Measurement results of RS 2 within time of t1 to t2 and measurement results of RS 3 and RS 4 within time of t3 to t2 are taken as the valid measurement result, and the signal quality within this period is obtained through calculation manners of the manner one and manner two in the embodiment.

3) Measurement results of RS 1 within time of t1 to t4, measurement results of RS 2 within time of t1 to t2 and measurement results of RS 3 and RS 4 within time of t4 to t2 are taken as the valid measurement result, and the signal quality within this period is obtained through calculation manners of the manner one and manner two in the embodiment.

4) Measurement results of RS 2 within time of t1 to t2 and measurement results of RS 3 and RS 4 within time of t4 to t2 are taken as the valid measurement result, and the signal quality within this period is obtained through calculation manners of the manner one and manner two in the embodiment.

Based on the above manner one and manner two, in a case of the cause two, the manner of measuring signal quality includes: in the process of recovering from the beam failure, the measurement signal in which the beam failure occurs before the moment when the beam failure is successfully recovered and within the RLM assessment period and the measurement signal in which the beam is successfully recovered within the RLM assessment period are taken as the object of signal quality measurement in the manner one and the manner two; or the measurement signal in which the beam is successfully recovered within the RLM assessment period is taken as the object of signal quality measurement in the manner one and the manner two.

Based on the detailed description of the cause two in the specific application scenario, in the case of the cause two, the manner of measuring the signal quality in the specific application scenario may be as follows.

1) The measurement result of the old RS before the moment when the beam failure is successfully recovered is taken as the valid measurement result, all measurement results of the new RS within this period are taken as the valid measurement result, and the signal quality of this period is calculated by adopting manners of the manner one and the manner two.

2) All measurement results of the new RS within this period are taken as the valid measurement result, and the signal quality of this period is calculated by adopting calculation manners of the manner one and the manner two.

Figure 6:
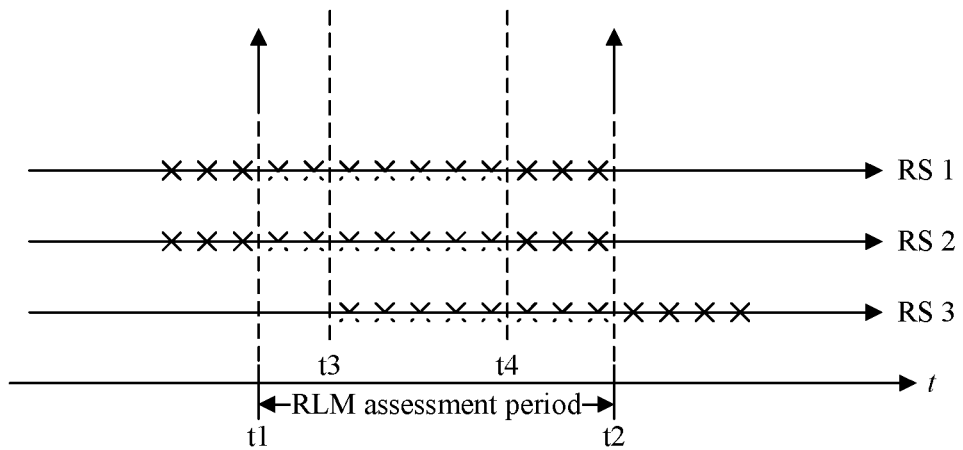
FIG. 6 is a schematic diagram four illustrating measurement on a serving beam within an RLM assessment period according to an embodiment of the present disclosure.

The manner of measuring signal quality will be illustrated in conjunction with FIG. 6 and based on the above cause two. FIG. 6 is a schematic diagram four illustrating measurement on a serving beam within an RLM assessment period according to an embodiment of the present disclosure. As shown in FIG. 6, beams 1 to 3 are transmitted on RS 1 to RS 3 respectively, and if the base station configures beam 1 and beam 2 to the UE as serving beams for signal reception, the UE needs to detect RS 1 and RS 2. Before time t3, the UE detects a beam failure and starts to identify new beams. At time t3, the UE identifies a new beam 3 which can meet requirement, then the UE transmits beam failure recovery to the network side and receives feedback transmitted by the network side at time t4, that is, the beam is successfully recovered at time t4. After time t4, the UE needs to detect RS 3. The signal quality within the RLM assessment period is obtained in following two manners.

1) Measurement results of RS 1 and RS 2 within time of t1 to t3 and measurement of RS 3 within time of t3 to t2 are taken as the valid measurement result, and the signal quality within this period is calculated by adopting manners of the manner one and the manner two.

2) Measurement results of RS 1 and RS 2 within time of t1 to t4 and measurement of RS 3 within time of t3 to t2 are taken as the valid measurement result, and the signal quality within this period is calculated by adopting manners of the manner one and the manner two.

3) Measurement of RS 3 within time of t3 to t2 is taken as the valid measurement result, and the signal quality within this period is calculated by adopting manners of the manner one and the manner two.

4) Measurement results of RS 1 and RS 2 within time of t1 to t3 and measurement of RS 3 within time of t4 to t2 are taken as the valid measurement result, and the signal quality within this period is calculated by adopting manners of the manner one and the manner two.

5) Measurement results of RS 1 and RS 2 within time of t1 to t4 and measurement of RS 3 within time of t4 to t2 are taken as the valid measurement result, and the signal quality within this period is calculated by adopting manners of the manner one and the manner two.

6) Measurement of RS 3 within time of t4 to t2 is taken as the valid measurement result, and the signal quality within this period is calculated by adopting manners of the manner one and the manner two.

If the signal quality metric used in the process of beam failure recovery is different from the signal quality metric used in the link quality detection, for example, the RSRP of the signal is used in the process of beam failure recovery and the SINR of the signal is used in the link quality detection, within time of t3 to t4, the UE does not start to measure the SINR, and in this case, the signal quality within the RLM assessment period is obtained in the following manner.

7) Measurement results of RS 1 and RS 2 within time of t1 to t4 and measurement of RS 3 within time of t4 to t2 are taken as the valid measurement result, and the signal quality within this period is calculated by adopting manners of the manner one and the manner two.

8) Measurement results of RS 1 and RS 2 within time of t1 to t3 and measurement of RS 3 within time of t4 to t2 are taken as the valid measurement result, and the signal quality within this period is calculated by adopting manners of the manner one and the manner two.

9) Measurement of RS 3 within time of t4 to t2 is taken as the valid measurement result, and the signal quality within this period is calculated by adopting manners of the manner one and the manner two.

If the signal quality metric used in the process of beam recovery is different from the signal quality metric used in the link quality detection, another measurement manner of the UE is that: after the UE identifies a new available beam, the UE starts to periodically performs RLM measurement on the new beam, that is, after time t3, the UE periodically detects the SINR of RS 3 at the same time, and in this way, measurement results of RS 3 within time of t3 to t4 within the RLM assessment period are taken as the valid measurement results within this period. In this case, it is to be noted that only after the beam failure is successfully recovered, RLM measurement results before the beam is successfully recovered are taken as the valid measurement result for periodically calculating the signal quality. If this beam is be successfully recovered eventually, the RLM measurement result on this beam is the invalid measurement result, and is not used for calculating the RLM signal quality. In other words, if beam 3 is successfully recovered from beam failure at time t4, measurement results of RS 3 within time of t3 to t4 are the valid measurement result; while if the beam failure still is not successfully recovered at time t2, measurement results of RS 3 between t3 and t2 are still the invalid measurement result and are not used for calculating the signal quality within this assessment period.

It is to be noted that in condition that the measurement signal of the UE uses the same signal as the beam update or beam failure recovery, a measurement signal resource of the UE is a subset of beam update or beam failure recovery resources.

Based on the above cause one, the method of this embodiment may further include that: the UE receives beam configuration update indication signaling transmitted by the network side at the moment when the beam changes. The indication signaling is used for indicating update of the measurement signal resource, and an indication manner of the indication signaling includes: explicit indication and implicit indication. The explicit indication refers to explicit indication of an updated measurement signal resource via the signaling, and the implicit indication refers to indication of the updated measurement signal resource via feature information of the signaling. The indication signaling may be a radio resource control (RRC) signaling, a media access control (MAC) control element (CE), or downlink control information (DCI).

In the specific application scenario, the RLM RS may be updated when the RLM and the beam management use different RSs.

If the RLM and the beam management use different RSs, when the serving beam of the UE changes, in the beam update indication transmitted to the UE, the network side indicates an updated RS resource used for the RLM at the same time. The notification manner includes two: explicit indication and implicit indication. The explicit indication refers to explicit notifying the UE of information on the new RS through information, and the implicit notification refers to indicating the new RS through some other features.

Figure 7:
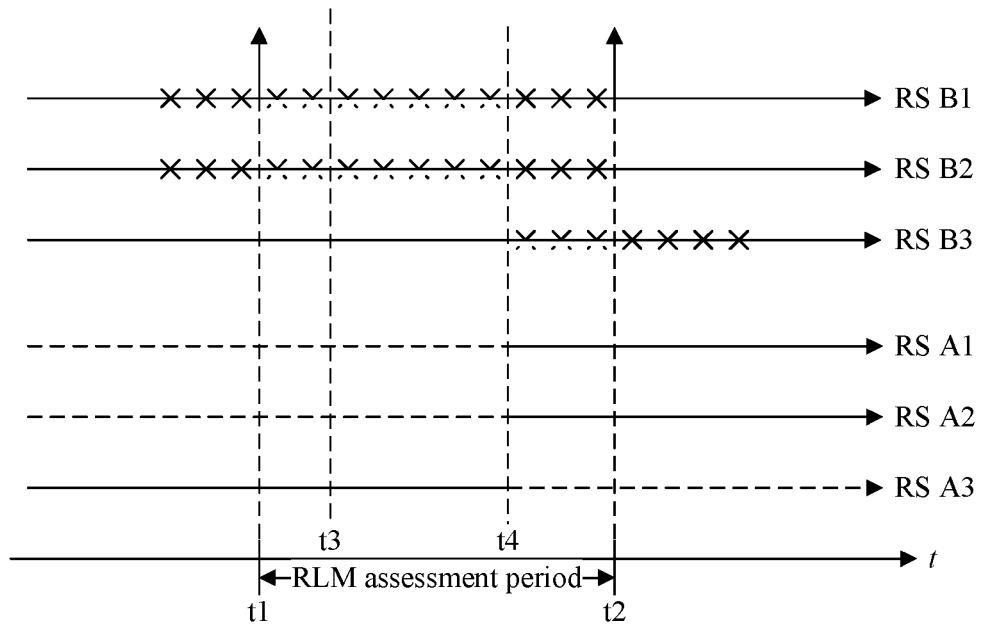
FIG. 7 is a schematic diagram five illustrating measurement on a serving beam within an RLM assessment period according to an embodiment of the present disclosure.

The above update process will be illustrated in conjunction with FIG. 7. FIG. 7 is a schematic diagram five illustrating measurement on a serving beam within an RLM assessment period according to an embodiment of the present disclosure. As shown in FIG. 7, RS A1 to RS A3 are used for beam management, RS B1 to RS B3 are used for the RLM, where RS A1 and RS B1 correspond to beam 1, RS A2 and RS B2 correspond to beam 2, and so on. At time t4, the network side transmits a signaling indication to the UE, indicating that a demodulation reference signal (DMRS) in a Physical Downlink Control Channel (PDCCH) and/or Physical Downlink Shared CHannel (PDSCH) of the UE and RS A3 has a quasi-collocation (QCL) relationship in space, which is equivalent to telling the UE that the serving beam is beam 3, so that this indication at the same time includes configuration of RS B3, such as a time frequency position, a pattern, a period, a resource index and the like, and RS B3 of the UE is the new RLM RS of the UE.

The network side notifies the UE of resources of each RS used for the RLM in advance, and also notifies the UE of a correspondence between the RLM RS and other RSs or a relationship between the RLM RS and the beam. For example, RS A1 corresponds to RS B1, RS A2 corresponds to RS B2, RS A3 corresponds to RS B3, and the same beam is transmitted on RSs having the correspondence. Alternatively, RS A1 and RS B1 correspond to beam 1, RS A2 and RS B2 correspond to beam 2, and RS A3 and RS B3 correspond to beam 3. At time t4, the network side transmits a signaling indication to the UE, indicating that the DMRS in the PDCCH and/or PDSCH of the UE and RS A3 have a QCL relationship, which is equivalent to telling the UE that the serving beam of the UE is beam 3, and that an RS used for the RLM from time t3 obtained by the UE according to the relationship notified by the network side in advance is RS B3. In this way, the network side does not need to additionally indicate the RS for the RLM, and the UE determines a new RS used for the RLM through a switched RS or beam.

Based on the above cause two, in another optional embodiment of this embodiment, the method of this embodiment may further include that: the UE receives beam failure recovery success indication signaling transmitted by the network side at the moment when the beam failure is successfully recovered, where the beam failure recovery success indication signaling indicates the update of the measurement signal resource, and an indication manner includes: explicit indication and implicit indication; where the explicit indication refers to explicit indication of an updated measurement signal resource via the signaling, and the implicit indication refers to indication of the updated measurement signal resource via feature information of the signaling. The beam failure recovery success indication signaling may be RRC signaling, MAC CE or DCI.

In the specific application scenario, after the beam is successfully recovered, the network side notifies the UE of the RS used for the RLM, and this RS corresponds to a new beam of the UE. In other words, a resource of the new RS is notified to the UE in the feedback transmitted by the network side to the UE, and the indication manner includes two: explicit indication and implicit indication. The explicit indication refers to explicit notifying the UE of information on the new RS through information, and the implicit notification refers to indicating the new RS through some other features.

Figure 8:
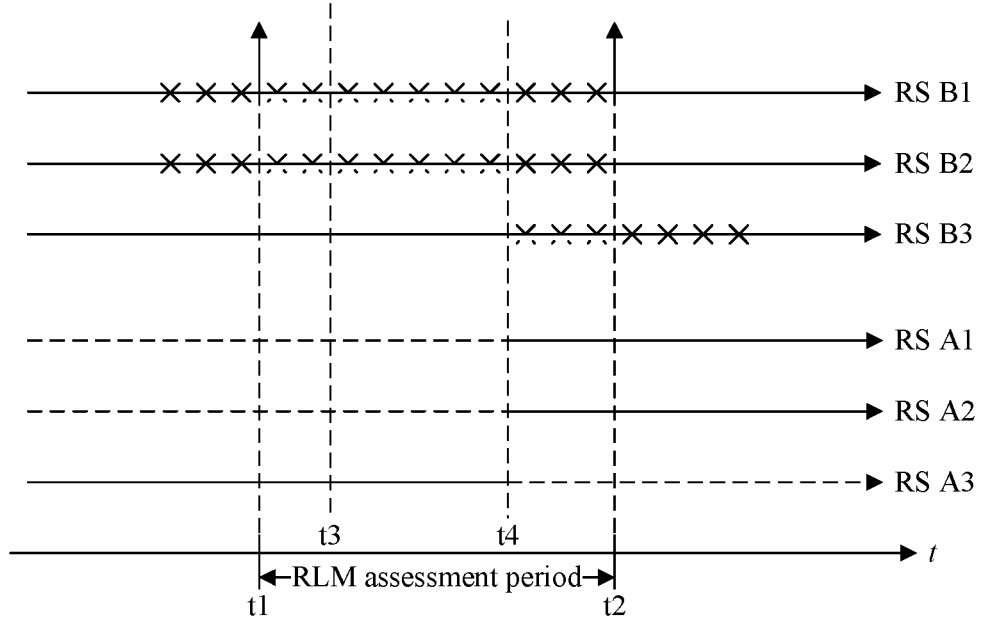
FIG. 8 is a schematic diagram six illustrating measurement on a serving beam within an RLM assessment period according to an embodiment of the present disclosure.

The above manner of failure recovery will be illustrated in conjunction with FIG. 8. FIG. 8 is a schematic diagram six illustrating measurement on a serving beam within an RLM assessment period according to an embodiment of the present disclosure. As shown in FIG. 8, RS A1 to RS A3 are used for beam recovery, RS B1 to RS B3 are used for the RLM, where RS A1 and RS B1 correspond to beam 1, RS A2 and RS B2 correspond to beam 2, and so on. At time t4, the network side transmits feedback for the beam failure recovery request to the UE, where the feedback notifies the UE that beam 3 is successfully recovered, and thus the feedback transmitted by the network side to the UE contains configuration of RS B3, such as a time frequency position, a pattern, a period, a resource index and the like. RS B3 of the UE is the new RLM RS of the UE.

The network side notifies the UE of resources of each RS used for the RLM in advance, and also notifies the UE of a correspondence between the RLM RS and other RSs or a relationship between the RLM RS and the beam. For example, RS A1 corresponds to RS B1, RS A2 corresponds to RS B2, RS A3 corresponds to RS B3, and the same beam is transmitted on RSs having the correspondence. Alternatively, RS A1 and RS B1 correspond to beam 1, RS A2 and RS B2 correspond to beam 2, and RS A3 and RS B3 correspond to beam 3. At time t4, the network side transmits feedback for the beam failure recovery request to the UE, where the feedback notifies the UE that beam 3 is successfully recovered, and the UE can obtain that RS B3 is the new RLM RS according to the correspondence notified in advance. In this way, the network side does not need to additionally notify the UE of the new RS used for the RLM when transmitting the feedback, and the UE determines the new RS used for the RLM through a switched RS or beam.

In another optional embodiment of this embodiment, for step S106 of this embodiment, in condition that the manner one, that the UE, specifically the physical layer, reports the IS or OOS indication to the higher layer according to the comparison result includes: the UE reports the OOS indication to the higher layer in condition that all averaged results are less than a preset first threshold value; and the UE reports the IS indication to the higher layer in condition that at least one result in all averaged results is greater than or equal to a preset second threshold value.

In condition that the manner two, that the UE, specifically the physical layer, reports the IS or OOS indication to the higher layer according to the comparison result includes: the UE reports the OOS indication to the higher layer in condition that averaged results are less than the preset first threshold value; and the UE reports the IS indication to the higher layer in condition that averaged results are greater than or equal to the preset second threshold value.

Specific values and value ranges of the first threshold value and the second threshold value are related to the processing capability of the UE and specifically related to the processing capability of hardware and/or software. The first threshold value is less than the second threshold value.

In addition, the method of this embodiment may further include that: at the moment when the beam failure is successfully recovered, the UE, specifically the physical layer, reports the IS indication to the higher layer, and detects the measurement signal in which the beam is successfully recovered from a moment for reporting the IS indication.

Based on the manner for reporting the indication at the moment when the beam failure is successfully recovered, in condition that the moment when the beam failure is successfully recovered is the same as the moment when the UE generates the IS indication or the OOS indication according to the comparison result or reports the IS indication or the OOS indication, the UE reports the IS indication on a time unit which is shifted backward from this moment, and detects the measurement signal in which the beam is successfully recovered from the moment for reporting the IS indication.

In the specific application scenario of this embodiment, the manner may be that: the UE, specifically the physical layer, periodically transmits the IS/OSS indication to the higher layer according to the RLM assessment result, where when the beam failure is successfully recovered within a certain RLM assessment period, the physical layer transmits the IS indication to the higher layer at the moment when the beam failure is successfully recovered, and the UE detects an RS in which the beam is successfully recovered from this moment and periodically reports the IS/OOS indication to the higher layer with this moment as a start point. If the moment when the beam failure is successfully recovered is exactly the same as the moment for reporting the IS/OOS indication, the UE reports the IS indication to the higher layer on a time unit which is shifted backward from this moment, or the UE does not report the IS/OOS indication at this moment, but reports the IS indication to the higher layer on a time unit which is shifted backward from this moment, and the UE detects the RS in which the beam is successfully recovered from the moment for reporting the IS and periodically reports the IS/OOS indication with this moment as the start point.

Figure 9:
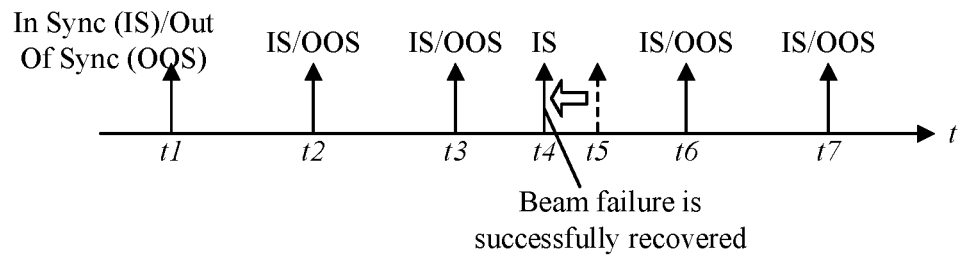
FIG. 9 is a schematic diagram seven illustrating measurement on a serving beam within an RLM assessment period according to an embodiment of the present disclosure.
Figure 10:
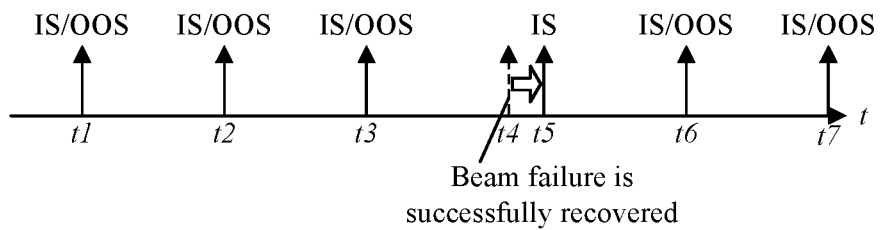
FIG. 10 is a schematic diagram eight illustrating measurement on a serving beam within an RLM assessment period according to an embodiment of the present disclosure.

The above manner for reporting the indication will be illustrated in conjunction with FIGS. 9 and 10. FIG. 9 is a schematic diagram seven illustrating measurement on a serving beam within an RLM assessment period according to an embodiment of the present disclosure. As shown in FIG. 9, when the UE periodically reports the IS/OOS at time t1, t2 and t3 and in the third period, i.e., within time of t3 to t5, the UE successfully recovers the beam at time t4, the UE reports the IS indication to the higher layer at time t4 without considering the RLM measurement result within time of t3 to t4, and the UE starts to detect the RS in which the beam is successfully recovered with t4 as a start point and periodically reports the IS/OOS indication to the higher layer according to the RLM assessment period.

FIG. 10 is a schematic diagram eight illustrating measurement on a serving beam within an RLM assessment period according to an embodiment of the present disclosure. As shown in FIG. 10, when the UE successfully recovers the beam at time t4 and the time t4 is also the moment when the UE reports the IS/OOS indication, the UE no longer reports the IS/OOS indication at time t4, but reports the IS indication to the higher layer on a time unit after t4 such as time t5, without considering the RLM measurement result within time of t3 to t5, and the UE starts to detect the RS in which the beam is successfully recovered with t5 as a start point and periodically reports the IS/OOS indication to the higher layer according to the RLM assessment period. Alternatively, the UE normally reports the IS/OOS indication at time t4 according to the RLM measurement result within time of t3 to t4, and reports the IS indication to the higher layer on a time unit after t4 such as time t5, without considering the RLM measurement result within time of t4 to t5, and the UE starts to detect the RS in which the beam is successfully recovered with t5 as a start point and periodically reports the IS/OOS indication to the higher layer according to the RLM assessment period.

Through the description of the preceding embodiments, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the technical solution of the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment Two

This embodiment further provides a device for reporting signal quality. The device is configured to implement the above embodiments and exemplary embodiments. What has been described will not be repeated. As used below, the term "module" may be software and/or hardware capable of implementing predetermined functions. The device described in the following embodiment is preferably implemented by software, but implementation by hardware or a combination of software and hardware is also possible and conceived.

Figure 11:
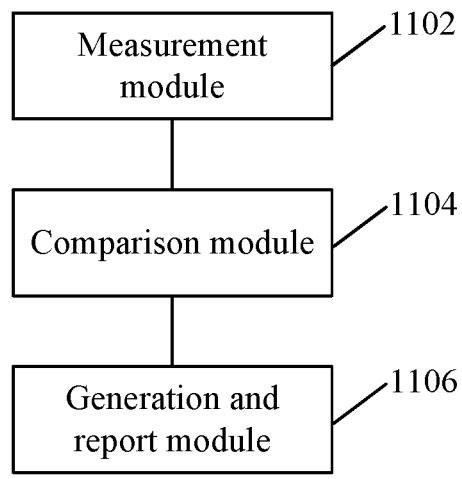
FIG. 11 is a structural diagram of a device for reporting signal quality according to an embodiment of the present disclosure.

FIG. 11 is a structural diagram of a device for reporting signal quality according to an embodiment of the present disclosure. As shown in FIG. 11, the device includes: a measurement module 1102, which is configured to measure signal quality of a measurement signal within an RLM assessment period and before a moment when a measurement signal of a UE changes and/or measure signal quality of a changed measurement signal within the RLM assessment period; a comparison module 1104, which is coupled with the measurement module 1102 and configured to compare the measured signal quality with a preset threshold value; and a generation and report module 1106, which is coupled with the comparison module 1104 and configured to generate an IS indication or an OOS indication according to the comparison result and report the IS indication or the OOS indication.

In an optional embodiment, the device for reporting signal quality may further include: a report module, which is configured to report the IS indication or the OOS indication to a higher layer of the UE.

It can be understood that the measurement module 1102, the comparison module 1104 and the generation and report module 1106 all are located on a UE side, specifically in a physical layer of the UE.

Optionally, in one embodiment of this embodiment, this embodiment involves the process of update and the process of failure recovery.

In a process of updating a set of measurement signals, the measurement signal within the RLM assessment period and before the moment when the measurement signal changes refers to a measurement signal set before a moment of updating the measurement signal set and within the RLM assessment period; and the changed measurement signal within the RLM assessment period refers to a measurement signal set after the measurement signal set is updated and within the RLM assessment period.

In a process of recovering from a beam failure, the measurement signal within the RLM assessment period and before the moment when the measurement signal changes refers to a measurement signal in which a beam failure occurs before a moment when the beam failure is successfully recovered and within the RLM assessment period; and the changed measurement signal within the RLM assessment period refers to a measurement signal in which the beam is successfully recovered within the RLM assessment period.

In the process of recovering from the beam failure and in condition that the successfully recovered beam is the same as the failed beam, the measurement signal in which the beam is successfully recovered within the RLM assessment period refers to: in condition that the moment when the failure occurs is outside the RLM assessment period, a measurement signal within the RLM assessment period and after the moment when the beam is successfully recovered; and in condition that the moment when the failure occurs is within the RLM assessment period, a measurement signal before the moment when the failure occurs within the RLM assessment period, within the RLM assessment period and after the moment when the beam is successfully recovered.

Optionally, the manner that the measurement module 1102 in this embodiment performs measurement includes a manner one and a manner two.

Manner one: acquiring signal quality of one or more measurement signals of the UE at multiple designated moments within the RLM assessment period, and averaging the signal quality of each measurement signal at the multiple designated moments; where the averaged result is used as the measured signal quality corresponding to the one or more measurement signals respectively.

Manner two: acquiring signal quality of one or more measurement signals of the UE at multiple designated moments within the RLM assessment period, determining maximum signal quality at each specific moment from the acquired signal quality, and averaging all of the determined maximum signal quality; where the averaged result is used as the measured signal quality.

Based on the above manner one and manner two, the measurement module 1102 in this embodiment may further be configured to: in the process of updating a measurement signal set, take a measurement signal set before the moment of updating the measurement signal set and within the RLM assessment period and a measurement signal set after the measurement signal set is updated and within the RLM assessment period as the object of signal quality measurement in the manner one and the manner two; or in the process of updating the measurement signal set of the UE, take the measurement signal set after the measurement signal set is updated and within the RLM assessment period as the object of signal quality measurement in the manner one and the manner two.

Optionally, the measurement module 1102 in this embodiment may further be configured to: in the process of recovering from the beam failure, take a measurement signal in which a beam failure occurs before the moment when the beam failure is successfully recovered and within the RLM assessment period and a measurement signal in which the beam is successfully recovered within the RLM assessment period as the object of signal quality measurement in the manner one and the manner two; or take a measurement signal in which the beam is successfully recovered within the RLM assessment period as the object of signal quality measurement in the manner one and the manner two.

It is to be noted that in condition that the measured measurement signal uses the same signal as the beam update or beam failure recovery, a measured measurement signal resource is a subset of beam update or beam failure recovery resources.

Optionally, the device of this embodiment may further include a first reception module and a second reception module.

The first reception module is coupled with the measurement module 1102 and is configured to receive measurement signal resource update indication signaling transmitted by a network side at the moment when the beam changes. The indication signaling is used for indicating update of the measurement signal resource, and an indication manner of the indication signaling includes: explicit indication and implicit indication. The explicit indication refers to explicit indication of an updated measurement signal resource via the signaling, and the implicit measurement signal resource indication refers to indication of the updated measurement signal resource via feature information of the signaling.

The second reception module is coupled with the measurement module 1102 and is configured to receive beam failure recovery success indication signaling transmitted by the network side at the moment when the beam failure is successfully recovered. The beam failure recovery success indication signaling indicates update of the measurement signal resource, and an indication manner of the indication signaling includes: explicit indication and implicit indication. The explicit indication refers to explicit indication of an updated measurement signal resource via the signaling, and the implicit indication refers to indication of the updated measurement signal resource via feature information of the signaling.

In one optional embodiment, the device described above further includes a processing module, and the generation and report module 1106 includes a first report sub-module and a second report sub-module.

In condition that the manner one, the first report sub-module in this embodiment is further configured to: report the OOS indication to a higher layer in condition that each of the all averaged results is less than a preset first threshold value; and report the IS indication to the higher layer in condition that at least one result in all averaged results is greater than or equal to a preset second threshold value.

In condition that the manner two, the first report sub-module in this embodiment is further configured to: report the OOS indication to the higher layer in condition that each of averaged results is less than the preset first threshold value; and report the IS indication to the higher layer in condition that each of averaged results is greater than or equal to the preset second threshold value.

Optionally, the second report sub-module is configured to report the IS indication at the moment when the beam failure is successfully recovered, and detect the measurement signal in which the beam is successfully recovered from a moment for reporting the IS indication. The processing module is configured to, in condition that the moment when the beam failure is successfully recovered is the same as the moment of generating the IS indication or the OOS indication according to the comparison result or reporting the IS indication or the OOS indication, report the IS indication on a time unit which is shifted backward from the moment, and detect the measurement signal in which the beam is successfully recovered from the moment for reporting the IS indication.

It is to be noted that the various modules described above may be implemented by software or hardware. Implementation by hardware may, but may not necessarily, be performed in the following manners: the various modules described above are located in the same processor, or the various modules described above are located in different processors in any combination form.

The embodiments of the present disclosure further include a computer storage medium. The storage medium includes stored programs which, when executed, perform the method according to any of the embodiments of the present disclosure.

Optionally, in this embodiment, the storage medium may be configured to store program codes for executing steps S1, S2 and S3.

In S1, signal quality of a measurement signal within an RLM assessment period and before a moment when the measurement signal changes and/or signal quality of a changed measurement signal within the RLM assessment period are measured.

In S2, the measured signal quality is compared with a preset threshold value; and In S3, an IS indication or an OOS indication is generated according to the comparison result and the IS indication or the OOS indication is reported.

Optionally, in this embodiment, the computer storage medium may include, but is not limited to, a USB flash disk, a Read-Only Memory (ROM), a Random Access Memory (RAM), a mobile hard disk, a magnetic disk, an optical disk or another medium capable of storing the program codes.

The embodiments of the present disclosure further include a processor. The processor is configured to execute programs which, when executed, perform steps of the method according to any of the embodiments of the present disclosure.

Optionally, in this embodiment, the programs are used for executing steps S1, S2 and S3.

In S1, signal quality of a measurement signal within an RLM assessment period and before a moment when the measurement signal changes and/or signal quality of a changed measurement signal within the RLM assessment period are measured.

In S2, the measured signal quality is compared with a preset threshold value; and In S3, an IS indication or an OOS indication is generated according to the comparison result and the IS indication or the OOS indication is reported.

Optionally, for specific examples in this embodiment, reference may be made to examples described in the above embodiment and exemplary embodiments, and what has been described will not be repeated herein.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present invention and not intended to limit the present invention, and for those skilled in the art, the present invention may have various modifications and variations. Any modifications, equivalent substitutions, improvements and the like made within the principle of the present disclosure should fall within the scope of the present disclosure.

It should be understood by those who skilled in the art that the embodiments of the present disclosure may be provided as a method, system, method or computer program product. Therefore, the present disclosure may take the form of a hardware embodiment, a software embodiment, or an embodiment combining software and hardware. Furthermore, the present disclosure may take the form of computer program product embodied on one or more computer-usable storage mediums (including, but not limited to, a magnetic memory, an optical memory, and so forth) having computer-usable program codes embodied therein.

The present disclosure is described below with reference to flowcharts and/or block diagrams of methods, apparatus (systems) and computer program products according to the embodiments of the present disclosure. It should be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in one or more flows of the flowcharts and/or one or more blocks of the block diagrams.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in one or more flows of the flowcharts and/or one or more blocks of the block diagrams.

These computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in one or more flows of the flowcharts and/or one or more blocks of the block diagrams.

The above are only preferred embodiments of the present disclosure and are not intended to limit the present disclosure.

What is claimed is:

1. A method for reporting signal quality, comprising:
measuring signal quality of a measurement signal within a radio link monitoring (RLM) assessment period and before a moment when the measurement signal changes and/or measuring signal quality of a changed measurement signal within the RLM assessment period;
comparing the measured signal quality with a preset threshold value; and
generating an in-sync (IS) indication or an out-of-sync (OOS) indication according to the comparison result and reporting the IS indication or the OOS indication,
wherein in a process of updating a set of measurement signals, wherein the measurement signal within the RLM assessment period and before the moment when the measurement signal changes refers to a measurement signal set before a moment of updating the measurement signal set and within the RLM assessment period, and wherein the changed measurement signal within the RLM assessment period refers to a measurement signal set after the measurement signal set is updated and within the RLM assessment period; and
in a process of recovering from a beam failure, wherein the measurement signal within the RLM assessment period and before the moment when the measurement signal changes refers to a measurement signal in which the beam failure occurs before a moment when the beam failure is successfully recovered and within the RLM assessment period; and wherein the changed measurement signal within the RLM assessment period refers to a measurement signal in which the beam is successfully recovered within the RLM assessment period.

2. The method of claim 1, wherein
in the process of recovering from the beam failure and in condition that the successfully recovered beam is a same as the failed beam, wherein the measurement signal in which the beam is successfully recovered within the RLM assessment period comprises:
in condition that the moment when the failure occurs is outside the RLM assessment period, a measurement signal within the RLM assessment period and after the moment when the beam is successfully recovered; and in condition that the moment when the failure occurs is within the RLM assessment period, a measurement signal before the moment when the failure occurs within the RLM assessment period, within the RLM assessment period and after the moment when the beam is successfully recovered.

3. The method of claim 1, wherein manners of the measuring the signal quality of the measurement signal within the RLM assessment period comprise:
manner one: acquiring signal quality of one or more measurement signals at a plurality of designated moments within the RLM assessment period; and averaging the signal quality of each measurement signal of the one or more measurement signals at the plurality of designated moments, wherein the averaged result is used as the measured signal quality corresponding to the one or more measurement signals respectively; and
manner two: acquiring signal quality of one or more measurement signals at a plurality of designated moments within the RLM assessment period; determining maximum signal quality at each designated moment of the plurality of designated moments from the acquired signal quality; and averaging all of the determined maximum signal quality, wherein the averaged result is used as the measured signal quality.

4. The method of claim 3, wherein
in a process of updating a measurement signal set of a user equipment (UE), the measurement signal set before the moment of updating the measurement signal set and within the RLM assessment period and the measurement signal set after the measurement signal set is updated and within the RLM assessment period are configured as an object of signal quality measurement in the manner one and the manner two; or
in the process of updating the measurement signal set of the UE, the measurement signal set after the measurement signal set is updated and within the RLM assessment period is taken as the object of signal quality measurement in the manner one and the manner two.

5. The method of claim 4, wherein
in condition that the manner one is adopted, wherein the generating the IS indication or the OOS indication according to the comparison result and reporting the IS indication or the OOS indication comprises: generating the OOS indication and reporting the OOS indication in condition that each of all averaged results is less than a preset first threshold value; and generating the IS indication and reporting the IS indication in condition that at least one result in all averaged results is greater than or equal to a preset second threshold value; and
in condition that the manner two is adopted, wherein the generating the IS indication or the OOS indication according to the comparison result and reporting the IS indication or the OOS indication comprises: generating the OOS indication and reporting the OOS indication in condition that each of the averaged results is less than the preset first threshold value; and generating the IS indication and reporting the IS indication in condition that each of the averaged results is greater than or equal to the preset second threshold value.

6. The method of claim 3, wherein
in the process of recovering from the beam failure, the measurement signal in which the beam failure occurs before the moment when the beam failure is successfully recovered and within the RLM assessment period and the measurement signal in which the beam is successfully recovered within the RLM assessment period are configured as an object of signal quality measurement in the manner one and the manner two; or
the measurement signal in which the beam is successfully recovered within the RLM assessment period is taken as the object of signal quality measurement in the manner one and the manner two.

7. The method of claim 1, wherein
in condition that the measurement signal uses a same signal as the beam update or beam failure recovery, the measurement signal resource is a subset of the beam update resources or beam failure recovery resources.

8. The method of claim 1, further comprising:
receiving beam configuration update indication signaling transmitted by a network side at a moment when the beam changes, wherein the indication signaling is configured for indicating update of a measurement signal resource;
wherein an indication manner of the indication signaling comprises: explicit indication and implicit indication, wherein the explicit indication refers to explicit indication of an updated measurement signal resource via the indication signaling, and the implicit indication refers to indication of the updated measurement signal resource via feature information of the indication signaling, wherein the beam configuration update indication signaling comprises at least one of: radio resource control (RRC) signaling, media access control (MAC) control element (CE) or physical layer control signaling downlink control information (DCI).

9. The method of claim 1, further comprising:
receiving beam failure recovery success indication signaling transmitted by a network side at the moment when the beam failure is successfully recovered, wherein the beam failure recovery success indication signaling indicates update of the measurement signal resource, an indication manner of the indication signaling comprises: explicit indication and implicit indication, wherein the explicit indication refers to explicit indication of an updated measurement signal resource via the indication signaling, and the implicit indication refers to indication of the updated measurement signal resource via feature information of the indication signaling; or configuring a signal resource corresponding to the successfully recovered beam as the updated measurement signal resource, wherein the beam failure recovery success indication signaling comprises at least one of: RRC signaling, MAC CE or DCI.

10. A non-transitory computer-readable storage medium, comprising stored programs which, when executed, perform the method of claim 1.

11. A processor, which is configured to execute programs which, when executed, perform the method of claim 1.

12. A device for reporting signal quality, comprising a processor and a storage device, wherein the storage device stores processor-executable programs, and the programs comprise:
a measurement module, which is configured to measure signal quality of a measurement signal within a radio link monitoring (RLM) assessment period and before a moment when a measurement signal of a user equipment (UE) changes and/or measure signal quality of a changed measurement signal within the RLM assessment period;
a comparison module, which is configured to compare the measured signal quality with a preset threshold value; and a generation and report module, which is configured to generate an in-sync (IS) indication or an out-of-sync (OOS) indication according to the comparison result and report the IS indication or the OOS indication, wherein in a process of updating a set of measurement signals, wherein the measurement signal within the RLM assessment period and before the moment when the measurement signal changes refers to a measurement signal set before a moment of updating the measurement signal set and within the RLM assessment period, and wherein the changed measurement signal within the RLM assessment period refers to a measurement signal set after the measurement signal set is updated and within the RLM assessment period; and in a process of recovering from a beam failure, wherein the measurement signal within the RLM assessment period and before the moment when the measurement signal changes refers to a measurement signal in which the beam failure occurs before a moment when the beam failure is successfully recovered and within the RLM assessment period; and wherein the changed measurement signal within the RLM assessment period refers to a measurement signal in which the beam is successfully recovered within the RLM assessment period.

13. The device of claim 12, wherein in the process of recovering from the beam failure and in condition that the successfully recovered beam is a same as the failed beam, the measurement signal in which the beam is successfully recovered within the RLM assessment period comprises:

in condition that the moment when the failure occurs is outside the RLM assessment period, a measurement signal within the RLM assessment period and after the moment when the beam is successfully recovered; and in condition that the moment when the failure occurs is within the RLM assessment period, a measurement signal before the moment when the failure occurs within the RLM assessment period, within the RLM assessment period and after the moment when the beam is successfully recovered.

14. The device of claim 12, wherein the measurement module performs the measurement in one of manners:

manner one: acquiring signal quality of one or more measurement signals of the UE at a plurality of designated moments within the RLM assessment period; and acquiring signal quality of the one or more measurement signals at a plurality of designated moments respectively, and averaging the signal quality of each measurement signal of the one or more measurement signals at the plurality of designated moments, wherein the averaged result is used as the measured signal quality corresponding to the one or more measurement signals respectively; or manner two: acquiring signal quality of one or more measuring signals of the UE at a plurality of designated moments within the RLM assessment period; determining maximum signal quality at each designated moment of the plurality of designated moments from the acquired signal quality; and averaging all of the determined maximum signal quality; wherein the averaged result is used as the measured signal quality.

15. The device of claim 14, wherein the measurement module is further configured to: in a process of updating a measurement signal set, set the measurement signal set before the moment of updating the measurement signal set and within the RLM assessment period and the measurement signal set after the measurement signal set is updated and within the RLM assessment period as an object of signal quality measurement in the manner one and the manner two; or in the process of updating the measurement signal set of the UE, set the measurement signal set after the measurement signal set is updated and within the RLM assessment period as the object of signal quality measurement in the manner one and the manner two.

16. The device of claim 15, wherein the generation and report module further comprises a first report sub-module;

in condition that the manner one is adopted, the first report sub-module is further configured to: report the OOS indication to a higher layer in condition that each of all averaged results is less than a preset first threshold value; and report the IS indication to the higher layer in condition that at least one result in the all averaged results is greater than or equal to a preset second threshold value; and in condition that the manner two is adopted, the first report sub-module is further configured to: report the OOS indication to a higher layer in condition that each of averaged results is less than the preset first threshold value; and report the IS indication to the higher layer in condition that each of the averaged results is greater than or equal to the preset second threshold value.

17. The device of claim 14, wherein the measurement module is further configured to: in the process of measurement signal recovery, set the measurement signal in which the beam failure occurs before the moment when the beam failure is successfully recovered and within the RLM assessment period and the measurement signal in which the beam is successfully recovered within the RLM assessment period as an object of signal quality measurement in the manner one and the manner two; or set the measurement signal in which the beam is successfully recovered within the RLM assessment period as the object of signal quality measurement in the manner one and the manner two.

\* \* \* \* \*